United States Patent [19]

Gupta et al.

[11] Patent Number: 4,527,173
[45] Date of Patent: Jul. 2, 1985

[54] ERASABLE, REUSABLE OPTICAL RECORDING ELEMENT AND METHOD

[75] Inventors: Mool C. Gupta, W. Webster; Joseph J. Wrobel, Rochester; Forrest C. Strome, Jr., Pittsford, all of N.Y.

[73] Assignee: Eastman Kodak Company, Rochester, N.Y.

[21] Appl. No.: 600,714

[22] Filed: Apr. 16, 1984

[51] Int. Cl.³ .................... G01D 15/34; G11C 13/04; G11B 7/00; G03E 1/76

[52] U.S. Cl. .................. 346/135.1; 365/124; 369/100; 430/22; 430/272; 430/495; 430/945; 346/76 L

[58] Field of Search .......... 346/135.1, 76 L; 369/100; 365/124; 430/19, 272, 495, 945

[56] References Cited

U.S. PATENT DOCUMENTS

| | | |
|---|---|---|
| 4,069,487 | 1/1978 | Kasai et al. |
| 4,101,907 | 7/1978 | Bell et al. |
| 4,264,986 | 4/1981 | Willis ............................ 365/124 |
| 4,300,143 | 11/1981 | Bell et al. |
| 4,314,262 | 2/1982 | Reilly |
| 4,334,233 | 6/1982 | Murakami ..................... 346/135.1 |
| 4,380,769 | 4/1983 | Thomas et al. |
| 4,388,400 | 6/1983 | Tabei et al. ....................... 430/346 |
| 4,403,231 | 9/1983 | Ando et al. ..................... 346/135.1 |
| 4,403,318 | 9/1983 | Nagashima et al. ................ 369/100 |
| 4,425,570 | 1/1984 | Bell et al. ....................... 346/135.1 |

FOREIGN PATENT DOCUMENTS

| | | |
|---|---|---|
| 24136 | 2/1981 | European Pat. Off. |
| 2727189 | 6/1977 | Fed. Rep. of Germany |
| 203237 | 7/1957 | Japan |

Primary Examiner—E. A. Goldberg
Assistant Examiner—Gerald E. Preston
Attorney, Agent, or Firm—John R. Everett

[57] ABSTRACT

An erasable, reusable recording element comprising a support having thereon a heat-deformable optical recording layer having a transparent overcoat is disclosed.

16 Claims, 3 Drawing Figures

ERASABLE, REUSABLE OPTICAL RECORDING ELEMENT AND METHOD

FIELD OF THE INVENTION

This invention relates to erasable, reusable optical recording elements particularly optical recording elements having heat-deformable recording layers overcoated with a transparent layer. The invention also relates to a method for erasing such elements.

BACKGROUND OF THE INVENTION

Recording elements in which information is recorded by thermally deforming an optical recording layer are known. Such elements are useful in rapidly recording large amounts of digital information in a small area. These elements are also useful in recording video information.

Recording on an optical recording element is accomplished by an information modulated beam of high energy-density radiation such as a laser beam. The laser beam is focused onto the surface of the optical recording layer of the element. The recording layer absorbs energy from the laser so that a small portion of the layer is deformed thereby forming an information bearing record element. The deformations may be in the form of pits, holes or other changes in the material. This technique of optical recording on a heat-deformable recording layer is usually referred to in the optical recording art as "ablative recording".

Generally, there is continuous relative motion between the laser beam and the layer so that as the layer is pulse modulated, discrete deformations of varying sizes are created in the layer. The sizes and spacing of these deformations constitute the encoded information. A variety of materials has been proposed for use for the heat-deformable recording layer.

It is known to overcoat heat-deformable optical recording layers for a variety of purposes. For example, during the ablative recording process, a portion of the optical recording layer is removed in the form of a vapor which condenses and rains back upon the recording layer creating the potential for unwanted noise. To overcome this problem, U.S. Pat. No. 4,069,487 discloses protective overcoats. These overcoats range in thickness of from 0.15 $\mu$m to 10 $\mu$m.

In U.S. Ser. No. 600,643, filed Apr. 16, 1984 in the name of Gupta et al and entitled "Ceramic Overcoated Optical Recording Elements Having Heat-Deformable Recording Layers", there is disclosed a recording element comprising a support having thereon a heat-deformable optical recording layer having a transparent ceramic overcoat having a thickness up to about 0.05 $\mu$m.

Useful information bearing record elements having a particularly useful heat-deformable optical recording layer comprising a dye and a binder are disclosed in U.S. Pat. No. 4,380,769 in the name of Thomas et al. This element stores the information in the form of heat deformations in information tracks. This element can be erased by applying heat uniformly over the surface to smooth out the information tracks. The problem is that the erasure cannot be carried out on such elements selectively, track by track or on portions of such tracks.

SUMMARY OF THE PRESENT INVENTION

We have discovered that an information bearing recording element comprising a support having thereon a heat-deformable optical recording layer having a transparent overcoat of virtually any thickness is erasable and reusable. The method comprises the steps of:

providing an information bearing record element in which the information is encoded in information tracks in the form of heat deformations in a heat-deformed optical recording layer;

applying sufficient heat to the information record element to smooth out the heat deformations forming the information tracks; characterized in that the optical recording layer has a transparent overcoat; and the heat is applied by selectively focusing one or more beams of high energy density radiation, such as a laser beam, which is absorbed by the optical recording layers, on the particular information track(s) or portion of track(s) desired. The erasing beam may be either unmodulated or modulated at a frequency high enough to cause adjacent beam exposure spots to overlap to a large extent thereby producing a quasi-continuous exposure.

The present invention also provides a novel erasable, reusable recording element comprising a support having thereon a heat-deformable optical recording layer characterized in that the layer has a transparent overcoat having a thickness greater than 0.05 $\mu$m up to about 0.1 $\mu$m.

In another aspect, the present invention also provides a novel information bearing record element comprising a support having thereon a record bearing heat-deformed optical recording layer characterized in that the recording layer has a transparent overcoat having a thickness greater than 0.05 $\mu$m up to 0.1 $\mu$m.

DESCRIPTION OF THE PREFERRED EMBODIMENTS

In a preferred method of the invention, the above described erasure process is carried out on a novel information bearing record element comprising a support having thereon a record bearing heat-deformed optical recording layer characterized in that the record bearing optical recording layer (a) is an amorphous layer of a dye and a binder;

(b) has an absorption factor of at least about 20 at a first wavelength and is substantially transparent at a second wavelength;

(c) has a plurality of deformations each of which comprise a hole or depression; and (d) has a transparent ceramic overcoat having a thickness greater than 0.05 $\mu$m up to 0.1 $\mu$m.

DETAILS OF THE INVENTION

Figure 1:
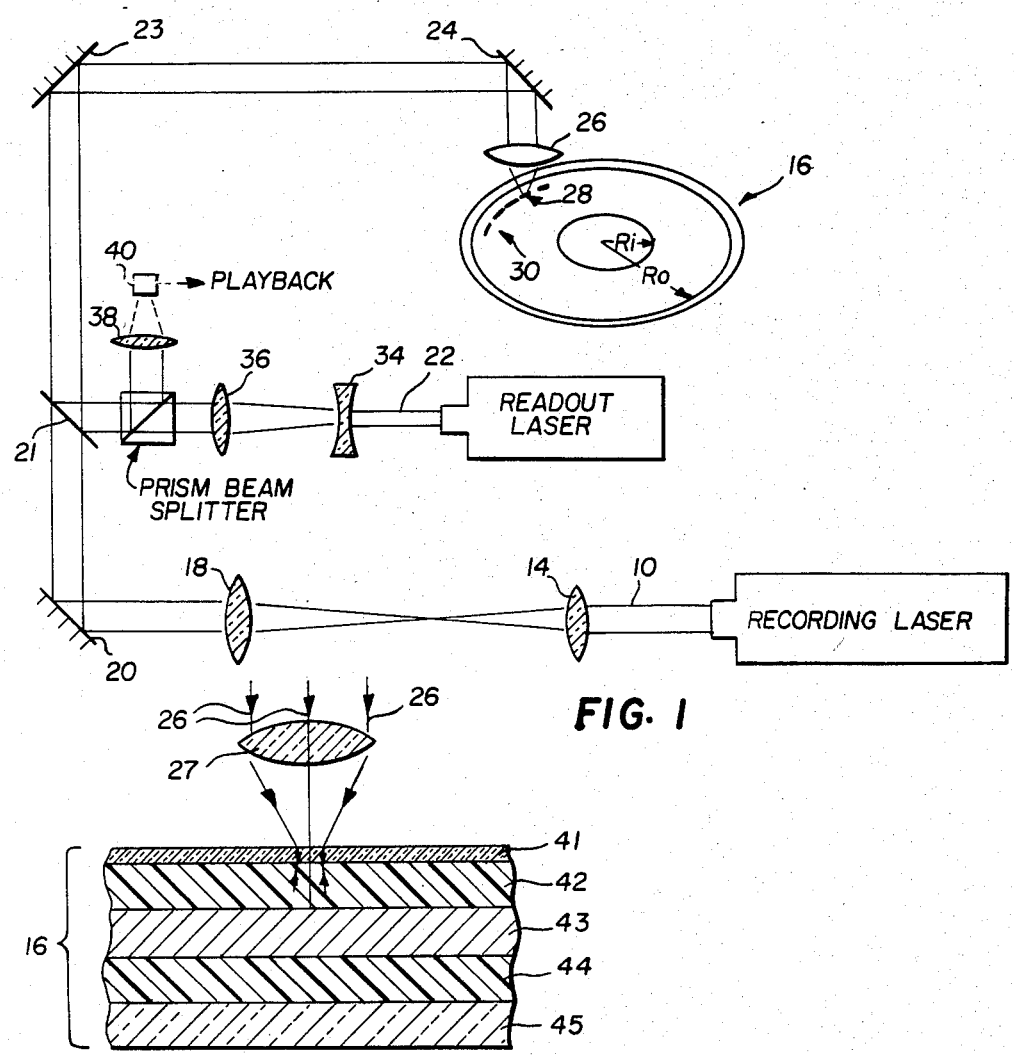
FIG. 1 shows a schematic apparatus for recording, reading back information and erasure on the recording elements of the invention.

A heat-deformable optical recording layer is any layer which is capable of undergoing thermal deformation when exposed to a beam of high energy-density radiation such as a laser beam. Deformations have been referred to in the art as pits, craters, depressions and cavities. Useful layers include thin vacuum-evaporated layers of metal such as bismuth, rhodium, titanium and platinum. Layers of vacuum-evaporated dyes are also useful, such as those described in U.S. Pat. No. 4,190,843 to Spong, issued Feb. 26, 1980. Bilayer and trilayer optical interference films are also useful. Useful recording layers also include chalcogenides such as those described in U.S. Pat. No. 4,069,487 to Kasai et al and solvent-coated dye-binder layers.

Preferred recording elements are disclosed in U.S. Pat. No. 4,380,769 granted Apr. 19, 1983 to Thomas et al. Such recording elements comprise a support having thereon a heat-deformable optical recording layer that (a) is an amorphous layer of a dye and a binder;

(b) has an absorption factor of at least 20 at a first wavelength and is substantially transparent at a second wavelength; and (c) is capable of being thermally deformed by a beam of high energy density radiation of the first wavelength to form a deformation comprising a hole or depression.

Such elements bearing transparent ceramic overcoats having a thickness above 0.05 μm up to 0.1 μm are novel. The "absorption factor" of the amorphous material is defined as the product of the weight fraction of dye included in the amorphous material and the molar extinction coefficient of the dye at the wavelength of the recording beam of choice, divided by the molecular weight of the dye (MW), and having the units of liter per gm-cm.

Other useful layers are disclosed in U.S. Pat. No. 4,415,621 granted to Specht et al, Nov. 15, 1983; U.S. patent application Ser. No. 391,769 filed June 24, 1982 in the name of Wadsworth et al, now U.S. Pat. No. 4,446,223 and U.S. patent application Ser. No. 473,825, filed Mar. 9, 1983 in the name of Molaire.

The overcoat materials are transparent at the read and write laser wavelength(s). Such overcoats should also have (1) low thermal diffusivity to avoid heat loss to the overcoat during recording;

(2) low adhesion to the optical recording layer;

(3) high viscosity under high temperature to avoid excessive flow during pit formation; and (4) be coatable in a continuous, homogenous film on the optical recording layer.

Desirably, the overcoat material should be as stable as possible. Useful overcoats include thermoplastic materials such as disclosed in U.S. Pat. No. 4,101,907 and U.S. Pat. No. 4,340,655 for barrier layers such as para-xylylene polymers. A particular useful polymer is poly(-vinylimidazol). Preferred overcoats are made from ceramic materials. Useful ceramic materials include aluminum oxide, silicon monoxide, SiO, silicon dioxide, $SiO_2$, silica, glass such as Schott-Glass ® (available from Schott Glass Company), quartz and magnesium fluoride ($MgF_2$).

Figure 2:
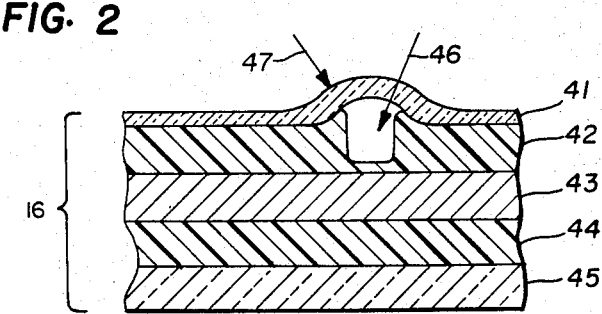
FIGS. 2 and 3 show a cross section of a recording element of the invention before and after recording respectively.

FIG. 1 shows schematically an apparatus for making the information bearing record element used in the erasure method of this invention. The apparatus is also used for playing back the information therefrom. Recording Element 16 comprises, as shown in FIG. 2, an overcoat layer 41, heat-deformable amorphous optical recording layer 42 reflecting layer 43 surface smoothing layer 44 and substrate 45.

The optical recording layer 42 preferably has a very high optical density, i.e., an absorption factor of 20 or greater at the wavelength of the recording beam of choice, in order to be able to absorb sufficient energy from the recording beam to undergo proper thermal deformation. The layer 42 has a glass transition temperature significantly higher than room temperature and lower than the temperature which is imparted during recording to a point on the layer by the recording beam of choice so that the layer 42 is able to retain the thermal deformation pattern after recording. A useful range of glass transition temperatures for layer 42 is preferably between about 40° C. and about 150° C., although higher and lower glass transition temperature materials are also useful.

As depicted in FIG. 1 in response to a drive signal, the intensity of a recording laser beam 10 is modulated in accordance with information to be recorded on recording Element 16. The modulated laser beam is collected by a lens 14 and collimated by a lens 18 and is directed by means of mirror Elements 20, 23 and 24 to a high numerical aperture lens 26 which focuses the modulated laser beam to a recording spot 28 on the recording Element 16.

During recording, the recording Element 16 is spun at a constant rate, e.g., 1800 rotations per minute (rpm). As a result, a track of encoded information 30, in the form of heat deformations, is recorded on the optical recording layer and recording Element 16 resulting in an information bearing record element. As recording continues, the recording spot 28 is caused (by means not shown) to scan radially inward across the recording Element 16, thereby causing information deformations to be recorded along a spiral track that extends from an outer radius $R_o$ to an inner radius $R_i$. The sizes and spacings of the recorded deformations vary in accordance with the information content of the recording laser drive signal, as well as with radial position on the recording Element 16.

Figure 3:
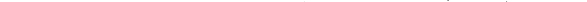

When the recordings are carried out on heat-deformable elements, the optical recording layer deforms to form pits. The pits in this embodiment represent the recorded information. FIG. 3 is a cross section of recording Element 16 after information has been recorded showing a pit 46 and an associated dome 47. The dome is formed in the overcoat during pit formation.

During the readback process, the now information bearing record Element 16 is spun at the same rate as it was spun during the recording process. A laser beam 22 from a readout laser is expanded in diameter by means of lenses 34 and 36. A diode laser could also be used for readout. The optical path of the readout laser beam is folded by a beam splitter 21 and mirrors 23 and 24 so that the readout laser beam is focused to a playback spot on the recording Element 16 by the high numerical aperture lens 26. The recording disk 16 is assumed to be of the reflective type so that the radiation forming the playback spot is reflected back through the high numerical aperture lens 26 after interacting with the information marks recorded on the optical Element 16. (In the case of a transmissive optical element, the playback optical system would be arranged so that the playback spot would pass through the optical disk in order to interact with recorded information masks.) A lens 38 directs reflected laser radiation which has been diverted by the prism beamsplitter onto a detector 40 which produces an electrical playback signal in response to temporal variations in the irradiance of the reflected laser radiation falling on the detector.

In the method of this invention the overcoated information bearing element produced by the above described recording process is erased by subjecting selected information tracks thereof to a laser beam as described above in the recording or playback process. This erasure beam may be unmodulated or modulated at a frequency high enough to cause adjacent beam exposure spots to overlap to a large extent thereby producing a quasi-continuous exposure. The laser beam radiation is absorbed by the recording layer creating heat which causes the information track upon which the laser beam is focused to smooth out as described below. The erase laser beam can be the same beam used during the recording process.

Overcoats are essential to the erasure method of this invention. First, the overcoats prevent loss of the material ablated during the recording process. This is important since erasure and re-recording involves smoothing out ablated pits by refilling the pits with the original recording layer composition.

Secondly, the overcoats provide stress that opposes the pushing of the recording layer material into the pit rims during recordings. The same stress forces the material back toward the pit centers during the erasure exposure. Electron micrographs have shown that thin overcoats up to about 0.05 $\mu$m tend to form dome-like structures situated over the pits which trap the material ablated from the recording layer to form pits during the recording process. In FIG. 3, a dome 47 is shown. The heated material solidifies in the rim around the pit. During the erasure exposure, the material trapped in the pit rims is reheated by absorbing energy from the laser beam. This reheating causes the ablated material to become plastic. The stress produced by the overcoat causes the reheated plastic ablated material to flow back into the pit.

Thicker overcoats (above about 0.05 $\mu$m) also trap material ablated from recording layers. They provide more opposition to pit formation and form shallower domes during the recording process. This leads to less well defined pits but allows for more rapid erasure, i.e., fewer revolutions or passes through the laser spot.

It is clear therefore that with sufficient laser power, erasure can be accomplished with overcoats of almost any thickness. Choosing an appropriate overcoat thickness for a given application is a trade-off between pit sharpness and ease of erasure, with thin overcoats favoring the former and thick overcoats favoring the latter. For erasure purposes, overcoat thickness up to 0.3 $\mu$m are preferred. However, optical recording elements having overcoats greater than 0.3 $\mu$m can also be erased using this method.

Readbacks carried out after a single erasure cycle (i.e., one pass of a pit through the unmodulated laser spot) show a reduced CNR (carrier-to-noise ratio) compared to the CNR of the original information bearing record element. Multiple erasure cycles reduces CNR further. By moving the laser beam slightly so that its spot is focused on the inner or outer rims of the pits as they move through the spot, additional material is caused to flow back into the pits and the readout carrier-to-noise ratio is reduced further. By using this technique with overcoated recording elements having heat-deformable optical recording layers, one is able to reduce the readout signals of selected information tracks, or portions thereof, so that they cannot be detected above the noise level of the recording element. This is referred to as complete erasure.

However, complete erasure is not required for a practical system because the readback electronics can be designed to respond only to signals having a magnitude exceeding a certain threshold. When a new signal is recorded on a previously erased track, it has been demonstrated that in some applications no interference from the previous recording can be observed.

The erasure method of this invention can be optimized further by optically tailoring the laser beam spot to have one high intensity region on one edge of the track, another high intensity region on the other edge of the track and a lower intensity region in the center of the track. Of course, the same result could be obtained by using two different lasers and focusing each laser spot on a different edge of the track through one lens system.

The method can be further optimized by elongation of the laser erase spot in the intrack direction to provide a longer exposure time. This will permit erasure in some cases in a single revolution. This elongation could be accomplished optically or by using additional lasers having their focused spot offset.

After a selected information track has been erased, as described above, other high quality recordings can be made in the erased information tracks. The CNR obtained is similar to the CNR obtained on the original blank overcoated recording element. That CNR is achieved with the same laser power as used in the initial recording. This demonstrates an erasable, reusable system.

The ceramic overcoated record element is capable of many record/erased/record cycles.

While this recording element disclosed in U.S. Pat. No. 4,380,769 bearing an overcoat as herein disclosed is used exemplifying the recording, playback and erase processes described herein, it is that other overcoated heat deformable optical recording layers in which an ablative writing process is used will also be erasable and reusable.

The following examples will illustrate the invention further.

Two different recording elements were prepared and used in testing the method of this invention. Each was prepared as follows. A 300-mm-diameter circular glass substrate was spin-coated with a surface-smoothing composition by flooding the glass substrate with the smoothing composition at low rpm (about 80–100 rpm) and then leveling the coating by advancing the speed to about 500 rpm. The surface-smoothing composition comprised:
 pentaerythritol tetraacrylate: 20 g
 a low-viscosity urethaneacrylate monomer (UV-curable Topcoat 874-C-2002 TM Fuller O'Brien Corp.): 20 g
 2-ethoxyethanol: 60 g
 a coumarin sensitizer composition: 3 g
 surfactant: 3 drops The coated and dried surface-smoothing composition was cured by irradiating with a 3000-watt pulsed xenon arc lamp at 18 inches for 4 minutes.

The thus smoothed surface of the substrate was then coated with a 0.05 $\mu$m thick reflecting layer of aluminum by vapor deposition.

Coating compositions comprising a 1:1 mixture of a dye, or a mixture of dyes, and a binder dissolved in bromobenzene were prepared. The coating composition were spin coated on the reflecting layer at a low rpm and then leveled at about 1300 rpm.

Using the above procedure, two different recording elements were prepared which were identical except for the optical recording layers. The dye and binder for each of the two elements were as follows:

Optical recording Element 1 was a 1:1 mixture of dye and binder. The dye was itself a 1:1 mixture of

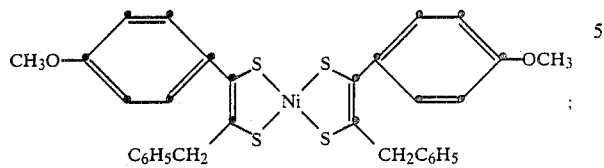

and

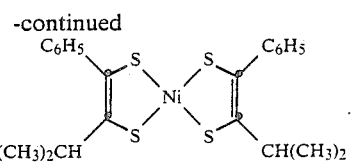

The binder used was a mixed compound represented by the structure:

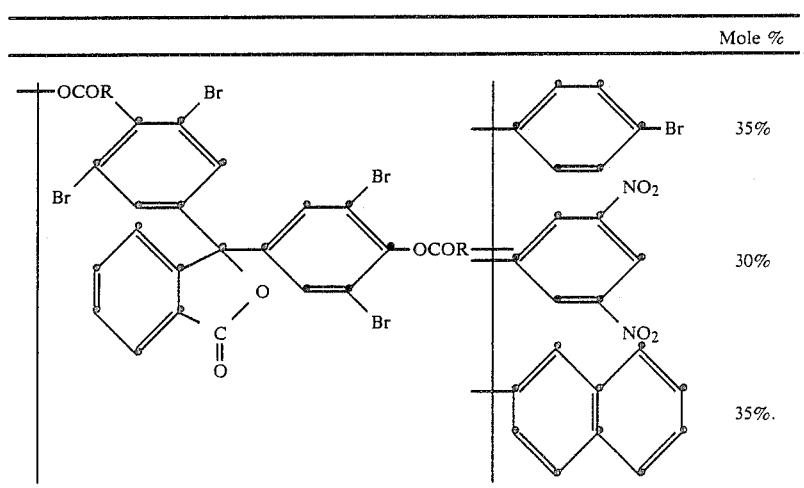

| | Mole % |
|---|---|
| —Br | 35% |
| —NO$_2$ / NO$_2$ | 30% |
| naphthyl-NO$_2$ | 35% |

Optical recording Element 2 was also a 1:1 mixture of two dyes and binder. The dye was a mixture of two isomers as follows:

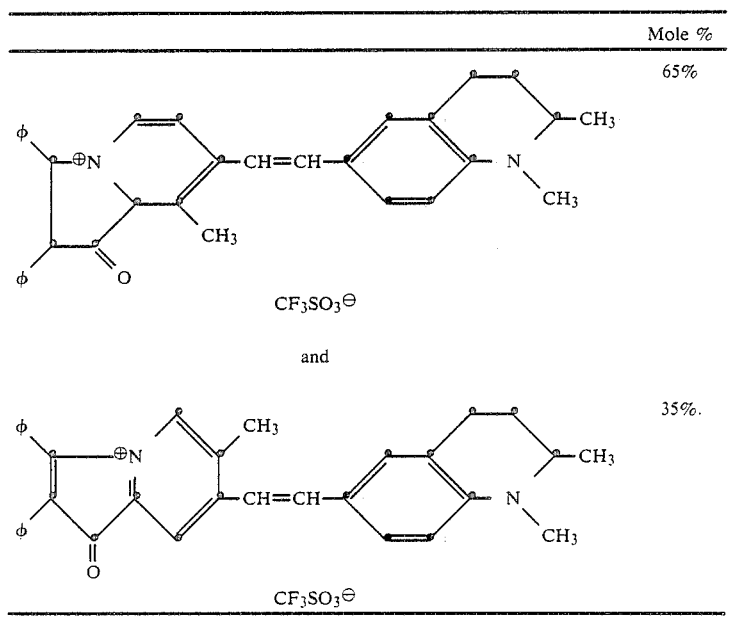

| | Mole % |
|---|---|
| (first isomer, CF$_3$SO$_3^\ominus$) | 65% |
| (second isomer, CF$_3$SO$_3^\ominus$) | 35% |

The binder was a mixed compound represented by the structure:

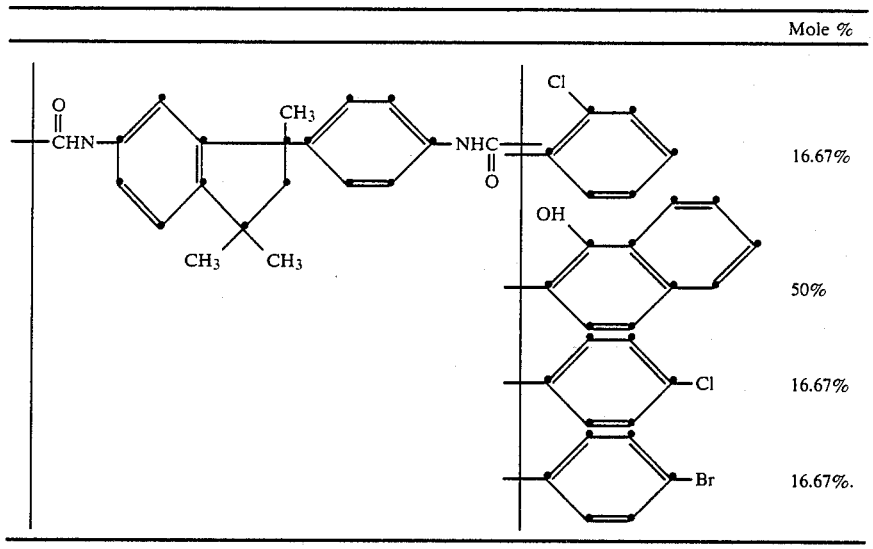

After drying, the recording elements were overcoated with a Schott-Glass available from the Schott Glass Company. Overcoating of the element was carried out by vacuum deposition.

EXAMPLE 1

The record/erase/record cycle described herein was carried out 3500 times on a 0.3 μm Schott-Glass overcoated Element No. 1. Carrier-to-noise ratio of 50 decibels (8.8 MHz carrier, 30 KHz bandwidth, element speed 19 m/sec) was obtained at the final recording.

EXAMPLE 2

The record/erase/record cycle was carried out on 0.3 μm Schott-Glass overcoated Elements 1 and 2. After the first recording, the elements had a CNR of 50 decibels. This CNR was reduced to only 20 decibels when subjected to three revolutions through the laser erase spot. The 50 decibel CNR was reproduced upon re-recording each element.

EXAMPLE 3

The record/erase/record cycle was carried out on both Elements 1 and 2 with 0.01 μm and 0.05 μm Schott-Glass overcoats. Each of the prepared elements were found to be erasable on a selective basis, track by track, when subjected to the erasure process described hereinbefore. Re-recording results were similar to those obtained on the original blank recording element.

The invention has been described in detail with particular reference to preferred embodiments thereof, but it will be understood that variations and modifications can be effected within the spirit and scope of the invention.

We claim:

1. An erasable, reusable recording element comprising a support having thereon in the following order:
   (a) a smoothing layer,
   (b) a metal reflection layer, and
   (c) a heat-deformable optical recording layer, characterized in that the optical recording layer:
      (i) is an amorphous layer of a dye and a binder;
      (ii) has an absorption factor of at least about 20 at a first wavelength and substantially transparent at a second wavelength;
      (iii) is capable of being thermally deformed by a beam of high energy density radiation of said first wavelength to form a deformation comprising a hole or depression; and
      (iv) has a transparent ceramic overcoat having a thickness greater than 0.05 μm up to 0.1 μm.

2. An erasable, reusable information bearing record element comprising a support having thereon the following layers in the following order:
   (a) a smoothing layer;
   (b) a metal reflection layer; and
   (c) an information bearing optical recording layer; characterized in that the record bearing optical recording layer
      (i) is a amorphous layer of a dye and a binder;
      (ii) has an absorption factor of at least 20 at a first wavelength and is substantially transparent at a second wavelength;
      (iii) has a plurality of deformations each of which comprise a hole or depression; and
      (iv) has a transparent ceramic overcoat having a thickness greater than 0.05 μm up to 0.1 μm.

3. The element of claim 1 or 2 wherein the overcoat is glass.

4. The element of claim 1 or 2 wherein the overcoat is Schott-Glass.

5. The element of claim 1 or 2 wherein the overcoat material is selected from the group consisting of $SiO_2$, $MgF_2$, SiO, quartz, silica and glass.

6. A method of erasing a recording element comprising the steps of:
   providing an information bearing record element in which the information is encoded in information tracks in the form of heat deformations in a heat-deformed optical recording layer; and
   applying sufficient heat to the information record element to smooth out the heat deformations forming the information tracks; characterized in that the optical recording layer;
      (a) is an amorphous layer of a dye and a binder;
      (b) has an absorption factor of at least 20 at a first wavelength and is substantially transparent at a second wavelength;
      (c) is capable of being thermally deformed by a beam of high energy density radiation of the first wavelength to form a deformation comprising a hole or depression; and (d) has a transparent ceramic overcoat having a thickness greater than 0.05 μm up to 0.1 μm and the heat is applied by selectively focusing one or more beams of high energy density radiation, which is absorbed by the optical recording layer, on the particular information track(s) or portion of track(s) to accomplish at least partial erasure.

7. The method of claim 6 wherein the beam of high energy density radiation is a laser beam which is first focused on one edge of the information track and then on the other edge of the information track to smooth out the heat deformations making up the track.

8. The method of claim 6 wherein a single laser beam is tailored optically to have two high intensity regions at each edge of the information track(s).

9. The method of claim 6 wherein a laser beam spot is focused on one edge of the information track(s) and another laser beam spot is focused on the other edge of the information track.

10. The method of claim 6 wherein the selected information track or portions thereof is subjected to multiple exposures of a laser beam in order to smooth out the heat deformations making up the information track.

11. The method of claim 10 wherein the laser beam spot is elongated in the direction of the selected information track.

12. The method of claim 8 wherein the transparent overcoat is a ceramic material having a thickness in the range of 0.05 μm up to 0.1 μm.

13. The method of claim 12 wherein the ceramic overcoat is Shott ® Glass.

14. The method of claim 8 wherein the information bearing record element comprises a support having thereon the following layers in the following order:
(a) a smoothing layer;
(b) a metal reflection layer; and
(c) an information bearing optical recording layer; wherein the record bearing optical recording layer
  (i) is an amorphous layer of a dye and a binder;
  (ii) has an absorption factor of at least 20 at a first wavelength and is substantially transparent at a second wavelength;
  (iii) has a plurality of deformations each of which comprise a hole or depression; and
  (iv) has a transparent ceramic overcoat having a thickness greater than 0.05 μm up to 0.1 μm.

15. An erasable, reusable recording element comprising a support having thereon a heat-deformable optical recording layer characterized in that the optical recording layer
(a) is an amorphous layer of a dye and a binder;
(b) has an absorption factor of at least 20 at a first wavelength and is substantially transparent at a second wavelength;
(c) is capable of being thermally deformed by a beam of high energy density radiation of the first wavelength to form a deformation comprising a hole or depression; and
(d) has a transparent ceramic overcoat having a thickness greater than 0.05 μm up to 0.1 μm.

16. An erasable, reusable information bearing record element comprising a support having thereon a record bearing heat-deformed optical recording layer characterized in that the record bearing optical recording layer
(a) is an amorphous layer of a dye and a binder;
(b) has an absorption factor of at least about 20 at a first wavelength and is substantially transparent at a second wavelength;
(c) has a plurality of deformations each of which comprise a hole or depression surrounded by a sharply defined ridge; and
(d) has a transparent ceramic overcoat having a thickness greater than 0.05 μm up to 0.1 μm.

* * * * *